(12) United States Patent
Kang et al.

(10) Patent No.: US 8,930,838 B2
(45) Date of Patent: Jan. 6, 2015

(54) DISPLAY APPARATUS AND DISPLAY METHOD THEREOF

(75) Inventors: Sung-rae Kang, Seoul (KR); Jong-whan Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 12/917,819

(22) Filed: Nov. 2, 2010

(65) Prior Publication Data

US 2011/0296327 A1  Dec. 1, 2011

(30) Foreign Application Priority Data

May 31, 2010  (KR) ......................... 10-2010-0051081

(51) Int. Cl.
G06F 3/048   (2013.01)
H04N 13/04   (2006.01)
H04N 13/00   (2006.01)

(52) U.S. Cl.
CPC ......... *H04N 13/007* (2013.01); *H04N 13/0456* (2013.01); *G06F 2203/04804* (2013.01); *H04N 2213/002* (2013.01); *H04N 13/004* (2013.01); *H04N 13/04* (2013.01)
USPC ............................................. 715/765; 348/51

(58) Field of Classification Search
None
See application file for complete search history.

(56) References Cited

U.S. PATENT DOCUMENTS

| | | | | |
|---|---|---|---|---|
| 5,651,107 A | * | 7/1997 | Frank et al. | 715/768 |
| 6,429,883 B1 | * | 8/2002 | Plow et al. | 715/768 |
| 6,670,970 B1 | * | 12/2003 | Bonura et al. | 715/768 |
| 8,503,869 B2 | | 8/2013 | Nakamura et al. | |
| 2003/0142108 A1 | * | 7/2003 | Brown et al. | 345/589 |
| 2003/0142109 A1 | * | 7/2003 | Brown et al. | 345/592 |
| 2003/0142133 A1 | * | 7/2003 | Brown et al. | 345/768 |
| 2003/0142139 A1 | * | 7/2003 | Brown et al. | 345/800 |
| 2003/0142148 A1 | * | 7/2003 | Brown et al. | 345/859 |
| 2003/0142149 A1 | * | 7/2003 | Brown et al. | 345/978 |
| 2007/0015118 A1 | * | 1/2007 | Nickell et al. | 434/118 |
| 2007/0128899 A1 | * | 6/2007 | Mayer | 439/152 |
| 2007/0146547 A1 | * | 6/2007 | Komlev et al. | 348/584 |
| 2008/0228393 A1 | * | 9/2008 | Geelen et al. | 701/208 |
| 2009/0135916 A1 | * | 5/2009 | Lee | 375/240.25 |
| 2009/0244379 A1 | * | 10/2009 | Tsai | 348/569 |

(Continued)

FOREIGN PATENT DOCUMENTS

| | | |
|---|---|---|
| KR | 10-2010-0022911 A | 3/2010 |
| WO | 99/23831 A2 | 5/1999 |
| WO | 2010-032399 A1 | 3/2010 |

OTHER PUBLICATIONS

Communication dated Jan. 8, 2014, issued by the European Patent Office in counterpart European Application No. 11167146.7.

(Continued)

*Primary Examiner* — Matt Kim
*Assistant Examiner* — Ryan Barrett
(74) *Attorney, Agent, or Firm* — Sughrue Mion, PLLC (57) ABSTRACT

A display apparatus and display method are provided. The display apparatus includes an image receiving unit which receives a 2D or 3D image, an image outputting unit which displays the 2D or 3D image received through the image receiving unit, an OSD processing unit which generates an OSD picture overlapped with and shown on the 2D or 3D image displayed through the image outputting unit, and a control unit which controls the OSD processing unit to adjust a transparency of the OSD picture when the 3D image is displayed through the image outputting unit.

11 Claims, 11 Drawing Sheets

(56) References Cited

U.S. PATENT DOCUMENTS

| | | | |
|---|---|---|---|
| 2010/0021141 A1* | 1/2010 | Yamashita et al. | 386/109 |
| 2010/0037175 A1* | 2/2010 | West | 715/788 |
| 2010/0045779 A1* | 2/2010 | Kwon et al. | 348/46 |
| 2010/0045780 A1* | 2/2010 | Kwon et al. | 348/51 |
| 2010/0074594 A1* | 3/2010 | Nakamura et al. | 386/92 |
| 2010/0142924 A1* | 6/2010 | Yamashita et al. | 386/95 |
| 2010/0182404 A1* | 7/2010 | Kuno | 348/43 |
| 2010/0201879 A1* | 8/2010 | Vanduyn et al. | 348/565 |
| 2010/0208042 A1* | 8/2010 | Ikeda et al. | 348/53 |
| 2010/0214473 A1* | 8/2010 | Kanai | 348/452 |
| 2010/0254019 A1* | 10/2010 | Cui et al. | 359/633 |
| 2010/0271288 A1* | 10/2010 | Srinivasan et al. | 345/2.2 |
| 2010/0275143 A1* | 10/2010 | Fu et al. | 715/768 |
| 2010/0292886 A1* | 11/2010 | Szczerba et al. | 701/29 |
| 2010/0306688 A1* | 12/2010 | Cho et al. | 715/768 |
| 2010/0323762 A1* | 12/2010 | Sindhu | 455/566 |
| 2010/0333030 A1* | 12/2010 | Johns | 715/834 |
| 2011/0149022 A1* | 6/2011 | Klebanov et al. | 348/42 |
| 2011/0216083 A1* | 9/2011 | McRae | 345/589 |
| 2011/0234760 A1* | 9/2011 | Yang et al. | 348/46 |
| 2011/0279644 A1* | 11/2011 | Suh et al. | 348/43 |
| 2011/0296327 A1* | 12/2011 | Kang et al. | 715/768 |
| 2012/0092467 A1* | 4/2012 | Jang | 348/51 |
| 2012/0102435 A1* | 4/2012 | Han et al. | 715/848 |

OTHER PUBLICATIONS

Communication dated Sep. 16, 2013, issued by the Korean Intellectual Property Office in counterpart Korean Application No. 10-2010-0051081.

* cited by examiner

DISPLAY APPARATUS AND DISPLAY METHOD THEREOF

CROSS-REFERENCE TO RELATED APPLICATIONS

This application claims priority from Korean Patent Application No. 10-2010-0051081, filed May 31, 2010, in the Korean Intellectual Property Office, the disclosure of which is incorporated herein by reference in its entirety.

BACKGROUND

1. Field

Apparatuses and methods consistent with exemplary embodiments relate to a display apparatus and a display method thereof. More specifically, an exemplary embodiment relates to a display apparatus and a display method thereof, which displays a three dimensional (3D) image.

2. Description of the Related Art

A three dimensional (3D) or stereoscopic image technology is currently applied in various fields, such as in information and telecommunications, broadcasts, education training, military affairs, games, animations, virtual reality, CAD, industrial technology, etc., and forms a basic core technology of next generation 3D multimedia information and telecommunications in such various fields.

Generally, a three dimensional effect that a human recognizes is obtained by a combination of a degree of change in thickness of a crystalline lens according to a position of an object to be observed, a difference in angle of both eyes to the object, a difference in position and shape of object images respectively viewed by a left and a right eye, a disparity caused by a movement of the object, an effect due to various kinds of mental states and memories, and the like.

Among those, the binocular disparity, which is present since the two eyes of a human are spaced-apart approximately 6-7 cm in a horizontal direction from each other, forms a very important factor of the three dimensional effect. That is, the human looks at the object with her or his two eyes having the difference in angle to the object due to the binocular disparity. Images caught through the respective eyes become different due to the difference in angle of the two eyes to the object. When the two images are transmitted through respective retinas of the two eyes to the brain, the brain unites the two pieces of image information together and thus becomes capable of seeing an original 3D or stereoscopic image.

A stereoscopic image display apparatus is divided into a glass type display apparatus using special glasses and a non-glass type display apparatus which does not use the special glasses. The glass type display apparatus is again divided into a color filter type display apparatus to divide and select images by using color filters complementary to each other, a polarization filter type display apparatus to divide left and right eye images by using an obscuration effect by a combination of orthogonal polarization elements, and a shutter glass type display apparatus to allow a user to feel the three dimensional effect by alternatively shading left and right eye images in response to symphonizing signals for projecting left and right eye image signals on a screen.

On the other hand, to allow the user to operate functions while watching images or to add an elegant ambience in the conventional 2D/3D display apparatus, a translucent on-screen Display (OSD) menu picture is used. However, if the 3D image and the translucent OSD menu picture are simultaneously displayed in an OSD mode, eyestrain of the user is increased because of the perspective of the image.

Also, there is a problem that since depths of the 3D image and the translucent OSD menu picture are mixed with each other, the user feels dizzy or eyestrain of the user can be increased.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

An exemplary embodiment provides a display apparatus and a display method thereof, which automatically adjusts a transparency of an OSD picture according to the kind of image to be displayed.

In an exemplary embodiment, a display apparatus includes an image receiving unit which receives a two-dimensional (2D) or three-dimensional (3D) image, an image outputting unit which displays the 2D or 3D image received through the image receiving unit, an OSD processing unit which generates an OSD picture overlapped with and indicated on the 2D or 3D image displayed through the image outputting unit, and a control unit which controls the OSD processing unit to adjust a transparency of the OSD picture when the 3D image is displayed through the image outputting unit.

In addition, the control unit may control the OSD processing unit to adjust the transparency of the OSD picture when at least one of the image and the OSD picture displayed through the image outputting unit is three dimensional.

Further, the control unit may control the OSD processing unit to automatically reduce the transparency of the OSD picture when the image displayed through the image outputting unit is changed from 2D to 3D according to a preset option.

In this case, the control unit may control the OSD processing unit to make the transparency of the OSD picture an opaque state.

Furthermore, the display apparatus may further include a user interface unit, and the control unit may control the OSD processing unit to automatically reduce the transparency of the OSD picture when the image displayed through the image outputting unit is changed from 2D to 3D according to a user command received through the user interface unit.

In this case, the control unit may control the OSD processing unit to make the transparency of the OSD picture an opaque state.

Moreover, the display apparatus may further include a user interface unit, and the control unit may control the OSD processing unit to automatically increase the transparency of the OSD picture when the image displayed through the image outputting unit is changed from 3D to 2D according to a user command received through the user interface unit or a preset event.

In this case, the control unit may control the OSD processing unit to make the transparency of the OSD picture a translucent state.

Also, when the OSD picture is 3D and the image displayed through the image outputting unit is changed from 3D to 2D, the control unit may control the OSD processing unit to change the OSD picture to 2D in a state that the transparency of the OSD picture is maintained.

In this case, the OSD processing unit may generate the OSD picture in a 2D picture or a 3D picture.

According to another an exemplary embodiment, a display method includes receiving a 2D or 3D image, displaying the received 2D or 3D image, generating an OSD picture overlapped with and shown on the displayed 2D or 3D image, determining whether the displayed image is a 2D image or a 3D image, and adjusting a transparency of the OSD picture when the displayed image is the 3D image.

In addition, the determining may determine whether at least one of the displayed image and the OSD picture is 3D, and the display method may further include adjusting the transparency of the OSD picture when the at least one of the displayed image and the OSD picture is 3D.

Further, the display method may further include changing the displayed image from 2D to 3D according to a preset option, and adjusting the transparency of the OSD picture to reduce the transparency of the OSD picture.

Here, the adjusting the transparency of the OSD picture to reduce the transparency of the OSD picture may adjust the transparency of the OSD picture to an opaque state.

Furthermore, the display method may further include changing the displayed image from 2D to 3D according to a user command, and adjusting the transparency of the OSD picture to reduce the transparency of the OSD picture.

Here, the adjusting the transparency of the OSD picture to reduce the transparency of the OSD picture may adjust the transparency of the OSD picture to an opaque state.

Moreover, the method may further include changing the displayed image from 3D to 2D according to a user command or a preset event, and adjusting the transparency of the OSD picture to increase the transparency of the OSD picture.

Here, the adjusting the transparency of the OSD picture to increase the transparency of the OSD picture may adjust the transparency of the OSD picture to a translucent state.

Also, the display method may further include changing the displayed image from 3D to 2D when the OSD picture is 3D, and changing the OSD picture to 2D in a state that the transparency of the OSD picture is maintained.

In this case, the OSD picture may be a 2D picture or a 3D picture.

Accordingly, eyestrain caused by a use of OSD mode in 3D motions can be reduced. In addition, it is possible to obtain an aesthetic effect, to display an OSD menu without disturbing an image being watched, and to display a varied OSD menu taking into consideration the eyestrain of the user.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Exemplary embodiments are described in greater detail below with reference to the accompanying drawings.

In the following description, like drawing reference numerals are used for the like elements, even in different drawings.

The matters defined in the description, such as detailed construction and elements, are provided to assist in a comprehensive understanding of the invention. However, the exemplary embodiments can be practiced without those specifically defined matters. Also, well-known functions or constructions are not described in detail since they would obscure the invention with unnecessary detail.

Figure 1:
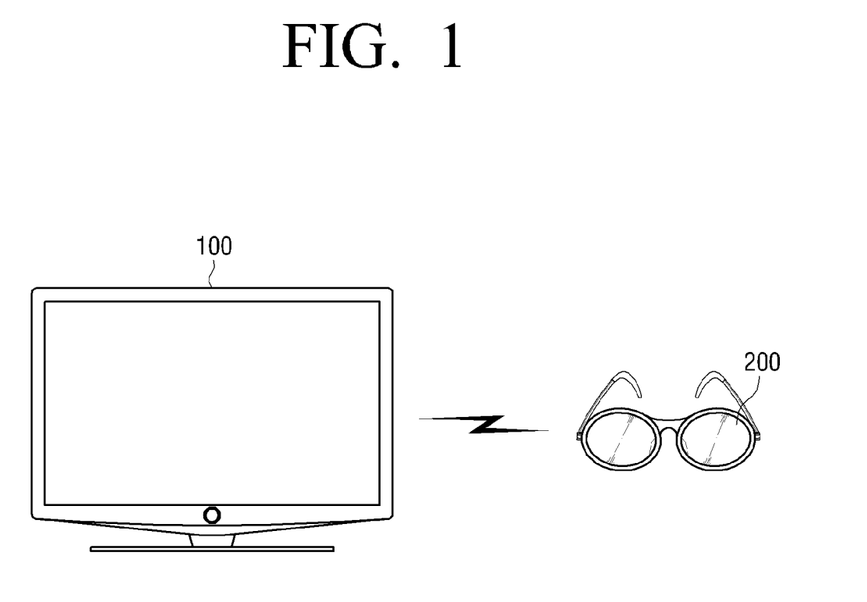
FIG. 1 is a view illustrating a 3D image providing system according to an exemplary embodiment.

FIG. 1 is a view illustrating a 3D image providing system according to an exemplary embodiment. As illustrated in the drawing, the 3D image providing system includes a display apparatus 100 for displaying a 3D image on a screen, and 3D glasses 200 for watching the 3D image.

The display apparatus 100 may be embodied to display a 3D image, or both a 2D image and the 3D image.

When displaying the 2D image, the display apparatus 100 may use the same method as that of a conventional 2D display apparatus, and when displaying the 3D image, it may receive a 3D image output from a photographing device, such as a camera or the like, or a 3D image sent from a broadcasting station after being photographed by a camera and then edited and/or processed at the broadcasting station, process the received image, and then display the processed image on a screen. Particularly, the display apparatus 100 may process left and right eye images while referring to a format of the 3D image, and time-share and alternatively display the processed left and right eye images.

The 3D glasses 200 may be embodied as a passive type of polarizing glass in which left and right eye glasses have different polarizations, or as an active type of shutter glass.

On the other hand, the 3D image providing system according to the exemplary embodiment may further include a camera (not shown) for producing the 3D image.

The camera (not shown), as a kind of photographing device for producing the 3D image, produces a left eye image photographed so as to be provided to a left eye of a user, and produces a right eye image photographed so as to be provided to a right eye of the user. That is, the 3D image is made up of the left and right eye images, and these left and right eye images generate a three dimensional effect by a binocular disparity while being alternatively provided to the left and right eyes of the user, respectively.

For this, the camera (not shown) is made up of a left eye camera for producing the left eye image and a right eye camera for producing the right eye image, and a space between the left eye camera and the right eye camera is considered and determined from a space between two eyes of a human.

The camera (not shown) transmits the photographed left and right eye images to the display apparatus 100. Particularly, the left and right eye images, which are transmitted to the display apparatus 100 from the camera, may be transmitted in a format in which one of the left eye image and the right eye image, or both the left eye image and the right eye image are included in one frame.

The camera (not shown) may predetermine one of various formats of 3D images, and generate the 3D image according to the determined format to transmit to the display apparatus 100.

On the other hand, although the 3D glasses 200 are explained as a component of an exemplary embodiment, an exemplary embodiment may be also applied to a display apparatus, upon which the 3D image can be viewed without the 3D glasses 200.

Figure 2:
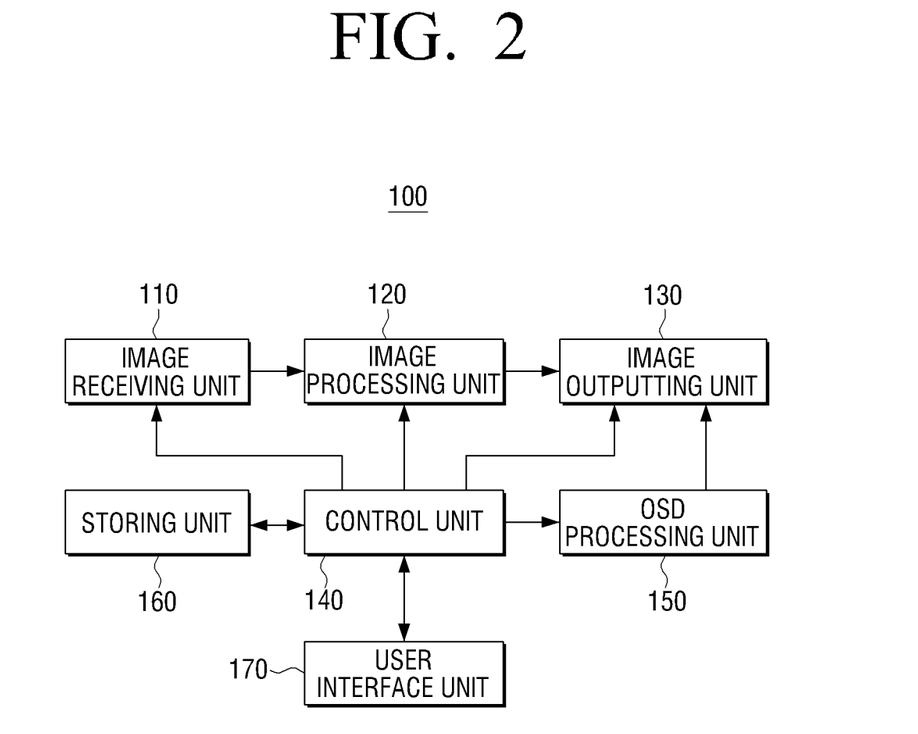
FIG. 2 is a block diagram illustrating a construction of a display apparatus illustrated in FIG. 1.

FIG. 2 is a block diagram illustrating a construction of the display apparatus according to an exemplary embodiment.

Referring to FIG. 2, the stereoscopic image display apparatus 100 includes an image receiving unit 110, an image processing unit 120, an image outputting unit 130, a control unit 140, an on-screen display (OSD) processing unit 150, a storing unit 160, and a user interface unit 170.

The image receiving unit 110 receives and demodulates a two dimensional (2D) or three dimensional (3D) image signal, which is received from a broadcasting station or a satellite by wire or radio. Also, the image receiving unit 110 may be connected with an external device, such as a camera or the like, to receive a 3D image therefrom. The external device may be connected by radio, or by wire through an interface, such as an S-video cable, a component cable, a composite cable, a D-subminiature cable, a DVI cable, a HDMI cable, or the like. Since a 2D image processing method is known to those skilled in the art, an explanation will be made with respect to a 3D image processing method.

A 3D image is an image made up of at least one frame, and left and right eye images are included in one frame or each frame is made up of a left eye image or a right eye image, as described above. That is, the 3D image is an image formed according to one of various 3D formats.

Accordingly, the 3D image received by the image receiving unit 110 may be formed in various formats, particularly, a format according to one of a general top-bottom form, a side-by-side form, a horizontal interleave form, a vertical interleave form, a checker board form, and a sequential frame.

The image receiving unit 110 transmits the received 2D or 3D image to the image processing unit 120.

The image processing unit 120 performs tasks, such as signal processing including a video decoding, format analysis, video scaling and the like, and graphic user interface (GUI) addition, to the received 2D or 3D image.

Particularly, the image processing unit 120 produces a left eye image and a right eye image corresponding to a size of one picture (for instance, 1920×1080 pixels), respectively, by using the format of the 2D or 3D image input into the image receiving unit 110.

For instance, if the format of the 2D or 3D image is the format according to the general top-bottom form, the side-by-side form, the horizontal interleave form, the vertical interleave form, the checker board form, or the sequential frame, the image processing unit 120 produces left and right eye images to be provided to a user by extracting left and right eye image portions from each image frame and magnification-scaling or interpolating the extracted left and right eye image portions.

Also, if the format of the 2D or 3D image is a general frame sequence form, the image processing unit 120 extracts left and right eye images from each image frame and prepares the images so they can be provided to a user.

On the other hand, information on the format of the input 3D image may be or not be included in the 3D image signal.

For instance, if the information on the format of the input 3D image is included in the 3D image signal, the image processing unit 120 analyzes the 3D image to extract the information on the format, and processes the received 3D image according to the extracted information. If the information on the format of the input 3D image is not included in the 3D image signal, the image processing unit 120 processes the received 3D image according to a format input by the user, or a format set up in advance.

The image processing unit 120 time-shares the extracted left and right eye images and alternately transmits them to the image outputting unit 130. That is, the image processing unit 120 transmits the extracted left and right eye images to the image outputting unit 130 in time order of 'a left eye image L1→a right eye image R1→a left eye image L2→a right eye image R2→ . . . '.

The image outputting unit 130 alternately outputs the left and right eye images output from the image processing unit 120 to provide them to the user.

The control unit 140 controls a general operation of the display apparatus 100 according to a user command received from the user interface unit 170 or a preset option.

Particularly, the control unit 140 controls the image receiving unit 110 and the image processing unit 120 to receive the 3D image, to divide the received 3D image into the left eye image and the right eye image, and to scale or interpolate each of the divided left and right eye images in a size capable of being displayed in one picture.

In addition, the control unit 140 may control the image outputting unit 130 to switch a polarization direction of the image provided through the image outputting unit 130 so as to coincide with the left eye image or the right eye image.

Also, the control unit 140 may control an operation of the OSD processing unit 150. The OSD processing unit 150 functions to generate an OSD picture overlapped with and indicated on a 2D or 3D image output to image outputting unit 130.

The OSD picture, as a menu picture or a picture indicating letters or figures, such as time or channel numbers, is overlapped with and indicated on the displayed image, so that it can be displayed on a display screen.

For instance, as the user operates an input device, such as an operation panel or a remote controller, to select a desired function from menus, a main menu, a submenu or the like may be displayed in an OSD form on the display screen.

The menus may include optional items capable of being selected in the display apparatus, or items capable of adjusting functions of the display apparatus.

The OSD processing unit 150 may perform tasks, such as a 2D/3D effect, a transparency effect, a color selection, a size selection, an adjustment of shape and position, a highlight effect, an animation effect, etc. of the OSD picture, under a control of the control unit 140.

Also, the OSD processing unit 150 may generate the OSD picture in a 2D or 3D picture according to a preset option, a preset event, or a user command.

The control unit 140 may control the OSD processing unit 150 to adjust a transparency of the OSD picture when a 3D image is displayed through the image outputting unit 130.

In addition, the control unit 140 may control the OSD processing unit 150 to adjust the transparency of the OSD picture when at least one of the image displayed through the image outputting unit 130 and the OSD picture is 3D.

Further, the control unit 140 may control the OSD processing unit 150 to automatically reduce the transparency of the OSD picture when the image displayed through the image outputting unit 130 is changed from 2D to 3D according to the preset option or the preset event. For instance, the control unit 140 may control the OSD processing unit 150 to make the transparency of the OSD picture an opaque state or a state having a transparency close to opaque. Here, the opaque state may not only mean a state where the transparency is 0, but also a state having a preset tolerance close to opaque.

Furthermore, the control unit 140 may control the OSD processing unit 150 to automatically increase the transparency of the OSD picture when the image displayed through the image outputting unit 130 is changed from 3D to 2D according to the preset option. For instance, the control unit 140 may control the OSD processing unit 150 to make the transparency of the OSD picture a translucent state.

Also, when the OSD picture is 3D and the image displayed through the image outputting unit 130 is changed from 3D to 2D, the control unit 140 may control the OSD processing unit 150 to change the OSD picture to 2D in a state that the transparency of the OSD picture is maintained.

The storing unit 160, as a storing medium storing various kinds of programs or the like needed to operate the stereoscopic image display apparatus 100, may be embodied by a memory, a hard disk drive (HDD) or the like. For instance, the storing unit 160 may include a ROM storing a program for performing an operation of the control unit 140, and a RAM temporarily storing data generated as a result of the operation of the control unit 140. Also, the storing unit 160 may further include an electrically erasable and programmable ROM (EEPROM) storing various kinds of reference data, etc.

The user interface unit 170 transmits a user command received from input means, such as the remote controller, the input panel, etc., to the control unit 140.

In this case, the control unit 140 may control the OSD processing unit 150 to automatically reduce the transparency of the OSD picture when the image displayed through the image outputting unit 130 is changed from 2D to 3D according to the user command received through the user interface unit 170. For instance, the control unit 140 may control the OSD processing unit 150 to make the transparency of the OSD picture an opaque state or a state close to opaque.

In addition, the control unit 140 may control the OSD processing unit 150 to automatically increase the transparency of the OSD picture when the image displayed through the image outputting unit 130 is changed from 3D to 2D according to the user command received through the user interface unit 170. For instance, the control unit 140 may control the OSD processing unit 150 to make the transparency of the OSD picture a translucent state. Here, the translucent state does not mean a state where the transparency is medium, but a level where the user can recognize the transparency to be translucent from her or his point of view.

Also, when the image displayed through the image outputting unit 130 is changed from 2D to 3D according to the user command received through the user interface unit 170, the preset option, the preset event, or the like, the control unit 140 may automatically display a scroll bar capable of adjusting the transparency of the OSD picture, so that the user can adjust the transparency of the OSD picture through the user interface unit 170.

Figure 3A:
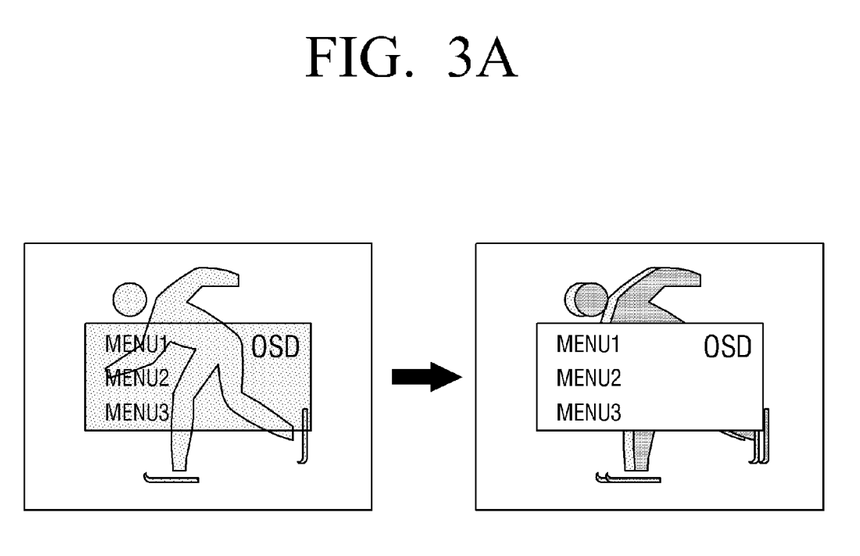
FIGS. 3A to 3C are views for explaining display methods according to various exemplary embodiments.
Figure 3B:
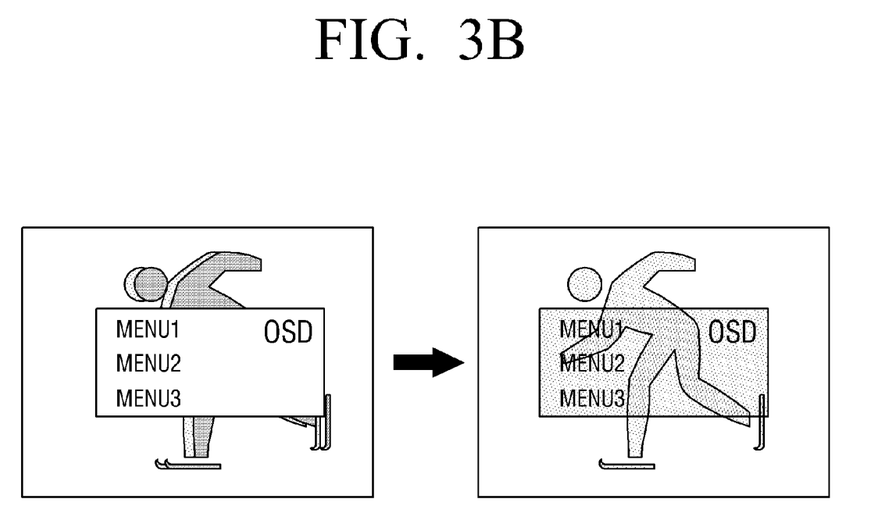
Figure 3C:
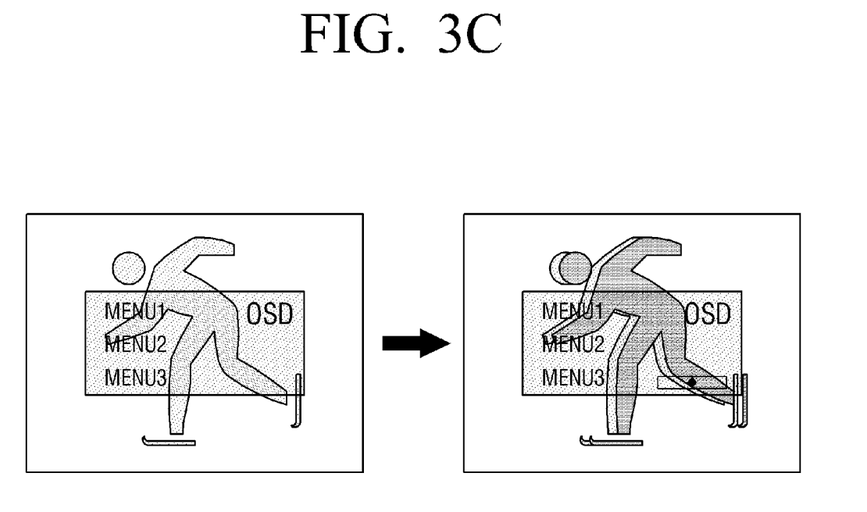

FIGS. 3A to 3C are views for explaining display methods according to various exemplary embodiments.

It is assumed that if a 2D image is displayed, an OSD menu picture is set, so that it is displayed in a translucent state, as illustrated in FIG. 3A.

In this case, if the 2D image, which has been displayed on a screen, is changed into a 3D image according to a preset option, a preset event or a user command, a transparency of the OSD picture may be automatically reduced. For instance, the transparency of the OSD picture may be become an opaque state. Therefore, eyestrain of the user can be reduced.

Also, as illustrated in FIG. 3B, if the 3D image, which has been displayed on the screen, is changed into a 2D image according to a preset option, a preset event, or a user command, the transparency of the OSD picture may be automatically returned to an initial state. However, this is only an exemplary embodiment, and even though the 3D image is changed into the 2D image, the transparency of the OSD picture may be maintained in the reduced state.

Alternatively, it may be embodied that as illustrated in FIG. 3C, when the 2D image, which has been displayed on the screen, is changed to 3D according to a user command, a preset option, a preset event or the like, a scroll bar capable of adjusting the transparency of the OSD picture is automatically displayed, so that the user can directly adjust the transparency of the OSD picture.

Figure 4A:
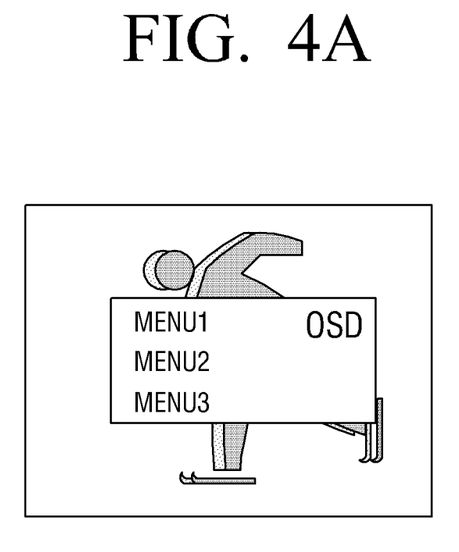
FIGS. 4A to 4C are views for explaining display methods according to various exemplary embodiments.
Figure 4B:
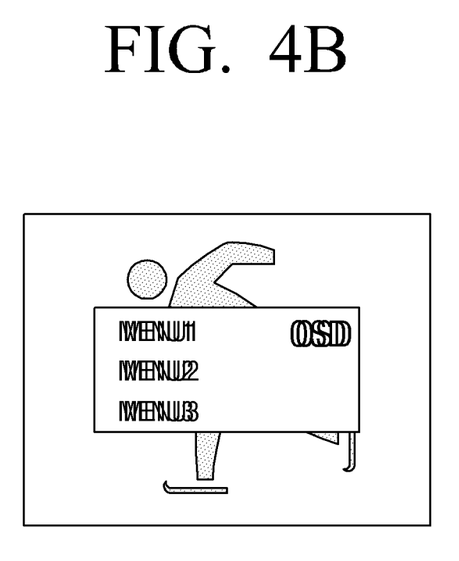
Figure 4C:
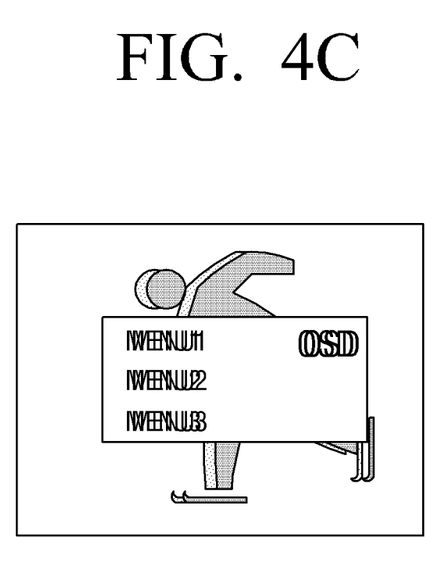

FIGS. 4A to 4C are views for explaining display methods according to various exemplary embodiments.

As illustrated in FIGS. 4A to 4C, when at least one of the image and the OSD menu picture displayed on the screen is 3D, a transparency of the OSD menu picture may be automatically adjusted.

As illustrated in FIG. 4A, if the image displayed on the screen is 3D, the transparency of the OSD menu picture may be automatically reduced even though the OSD menu picture is 2D. For instance, the OSD menu picture may be automatically adjusted, so that the transparency thereof becomes an opaque state or a state close to opaque.

In addition, as illustrated in FIG. 4B, if the OSD menu picture is 3D, the transparency of the OSD menu picture may be automatically reduced even though the image displayed on the screen is 2D. For instance, the OSD menu picture may be automatically adjusted, so that the transparency thereof becomes an opaque state or a state close to opaque.

As illustrated in FIG. 4C, even if the image displayed on the screen and the OSD menu picture are all 3D, the transparency of the OSD menu picture may be automatically reduced.

Since depths of the image and the OSD menu picture are not mixed with each other, the eyestrain of the user can be reduced.

Figure 5A:
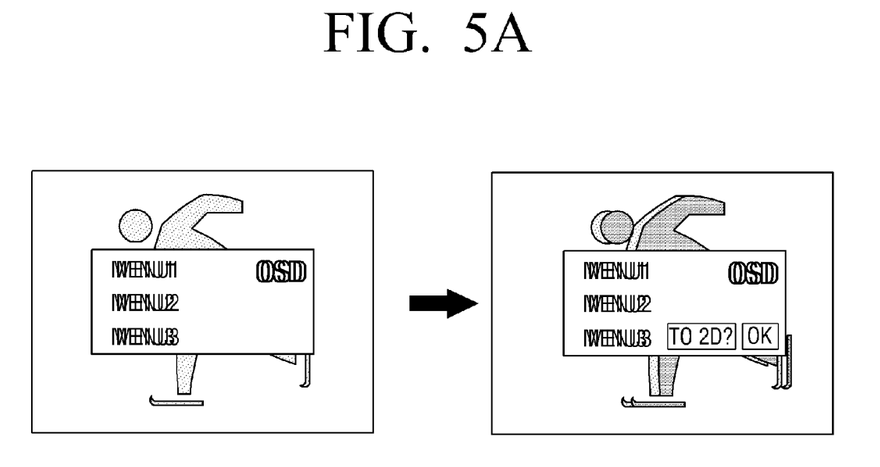
FIGS. 5A and 5B are views for explaining display methods according to various exemplary embodiments.
Figure 5B:
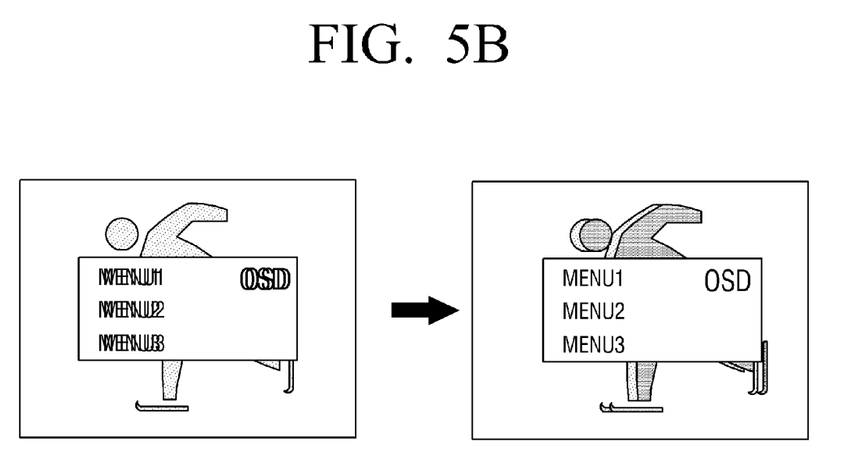

FIGS. 5A and 5B are views for explaining display methods according to various exemplary embodiments.

Referring to FIG. 5A, if the OSD menu picture is set to 3D, the 2D image, which has been displayed on the screen, is changed to 3D according to a user command, a preset option, a preset event or the like, an input window asking the user whether the OSD picture is to be changed to 2D may be automatically displayed to allow the user to select it.

Also, referring to FIG. 5B, if the OSD menu picture is set to 3D, the 2D image, which has been displayed on the screen, is changed to 3D according to a user command, a preset option, a preset event or the like, the OSD picture may be automatically changed to 2D.

On the other hand, in the drawings according to the above described exemplary embodiments, although the picture is changed from 2D to 3D in a state where the OSD picture is displayed or indicated, this is only for convenience of explanation, and it will be appreciated by those skilled in the art that the exemplary embodiment is not always applied only in the state where the OSD picture is indicated.

Also, although the above described exemplary embodiments are explained as adjusting the transparency, and 2D and 3D display of the OSD picture, the exemplary embodiment is not limited thereto and may be embodied in various types of embodiments.

As an example, if the 2D image, which has been displayed on the screen, is changed to 3D according to a user command, a preset option, a preset event or the like, the OSD menu picture may automatically change a color thereof, or a corresponding color menu may be automatically displayed to allow the user to select the color of the OSD menu picture. For instance, the OSD menu picture can change the color of the OSD menu picture to be dark or deep, thereby increasing a visibility and reducing the eyestrain of the user.

As another example, if the 2D image, which has been displayed on the screen, is changed to 3D, the OSD menu picture may automatically change a position thereof, or a corresponding position menu may be automatically displayed to allow the user to select the position of the OSD menu picture. For instance, the OSD menu picture can be automatically moved left or right and/or up or down on the screen.

As the other example, if the 2D image, which has been displayed on the screen, is changed to 3D, the OSD picture may automatically change a size thereof, or a corresponding size menu may be automatically displayed to allow the user to adjust the size of the OSD picture. For instance, the OSD menu picture can reduce the size thereof.

Also, it is possible to change a type of the OSD menu picture or to add a highlight effect, an animation effect, etc. on the OSD menu picture.

Figure 6:
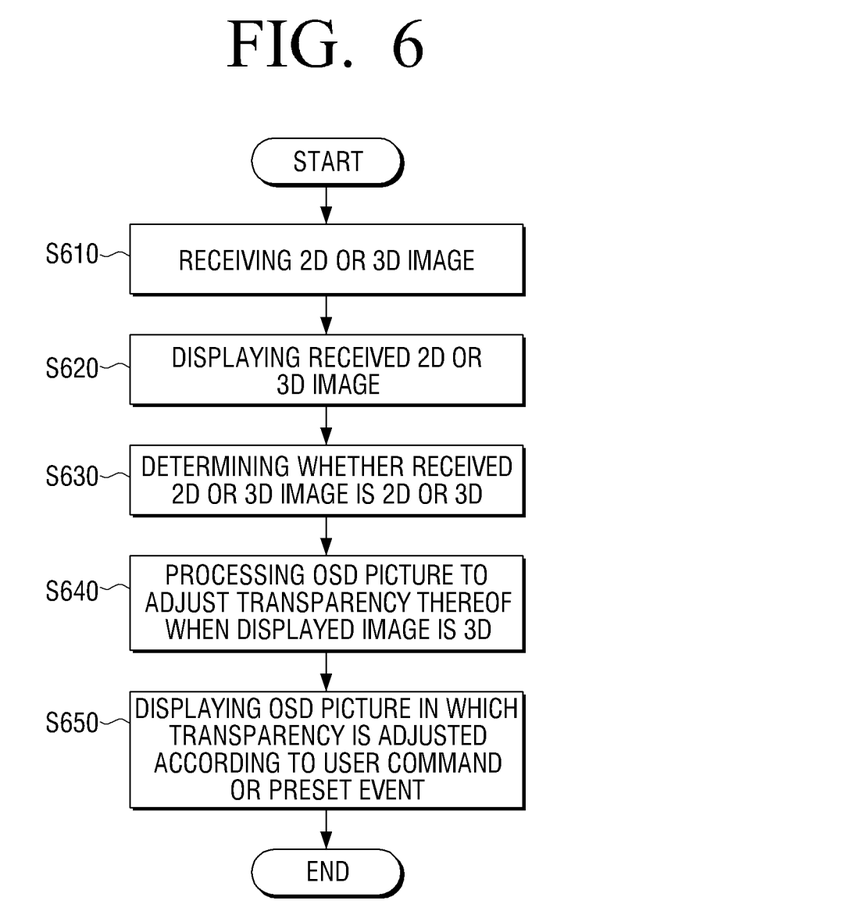
FIG. 6 is a flow chart for explaining a display method according to an exemplary embodiment.

FIG. 6 is a flowchart for explaining a display method according to an exemplary embodiment.

Referring to FIG. 6, when a 2D or 3D image is received (S610), the received 2D or 3D image is displayed (S620). Next, it is determined whether the displayed image is a 2D image or a 3D image (S630). As a determination result of the step S630, if the image is a 3D image, an OSD picture is processed to adjust a transparency thereof (S640). Here, the OSD picture may be a 2D picture or a 3D picture.

Thereafter, the OSD picture in which the transparency is adjusted according to a user command, a preset option, a preset event or the like, is displayed (S650).

In addition, it is determined whether at least one of the image and the OSD menu picture, which are displayed, is 3D, and if the at least one of the image and the OSD menu picture is 3D, the transparency of the OSD picture may be adjusted.

Further, if the image, which is displayed, is changed from 2D to 3D according to the preset option, the transparency of the OSD picture may be adjusted, so that it is reduced. Here, the transparency of the OSD picture may be adjusted, so that it becomes an opaque state or a state close to opacity. Furthermore, if the image, which is displayed, is changed from 2D to 3D according to the user command, the transparency of the OSD picture may be adjusted, so that it is reduced. Here, the transparency of the OSD picture may be adjusted, so that it becomes an opaque state or a state close to opaque.

Moreover, if the image, which is displayed, is changed from 3D to 2D according to the user command or the preset event, the transparency of the OSD picture may be adjusted, so that it is increased. Here, the transparency of the OSD picture may be adjusted, so that it becomes a translucent state or a state close to translucent.

Also, if the OSD picture is 3D and the image, which is displayed, is changed from the 3D image to the 2D image, the OSD picture may be changed to 2D in a state where the transparency thereof is maintained.

On the other hand, although the exemplary embodiment is explained as judging when the picture change is carried out and then determining whether the transparency of the OSD picture is to be adjusted, it may be embodied to determine whether the picture change is carried out, whether the transparency of the OSD picture is to be adjusted, and the like only when there is the preset option, the preset event or the user command for displaying the OSD picture even though the picture change is carried out. This may be properly realized and designed as occasion demands.

Accordingly, eyestrain caused by the 2D/3D change of a picture and the display of OSD menu can be reduced.

In addition, it is possible to obtain an aesthetic effect, to display an OSD menu without disturbing an image being watched, and to display a varied OSD menu considering the eyestrain of the user.

The foregoing exemplary embodiments are merely exemplary and are not to be construed as limiting. The present teaching can be readily applied to other types of apparatuses.

Also, the description of the exemplary embodiments is intended to be illustrative, and not to limit the scope of the claims, and many alternatives, modifications, and variations will be apparent to those skilled in the art.

What is claimed is:

1. A display apparatus comprising:
a processor;
an image receiving unit which receives a two-dimensional (2D) or a three-dimensional (3D) image;
an image outputting unit which displays the 2D or the 3D image received through the image receiving unit;
an on-screen display (OSD) processing unit which generates OSD picture overlapped with and shown on the 2D or the 3D image displayed through the image outputting unit; and
a control unit which controls the OSD processing unit to adjust a transparency of the OSD picture according to the 2D image or the 3D image which is displayed through the image outputting unit,
wherein the OSD picture is two-dimensional (2D) or three-dimensional (3D);
wherein when the image is displayed in 2D or 3D and the OSD is displayed in 2D or 3D, such that the OSD is displayed in a different dimension than the image, adjusting the OSD to be in an opaque state.

2. The apparatus of claim 1, wherein the control unit controls the OSD processing unit to automatically reduce the transparency of the OSD picture when the OSD picture is 2D and the image displayed through the image outputting unit is changed from the 2D image to the 3D image according to a preset option,
wherein the control unit controls the OSD processing unit to make the transparency of the OSD picture an opaque state.

3. The apparatus of claim 1, further comprising:
a user interface unit,
wherein the control unit controls the OSD processing unit to automatically reduce the transparency of the OSD picture when the OSD picture is 2D and the image displayed through the image outputting unit is changed from the 2D image to the 3D image according to a user command received through the user interface unit,
wherein the control unit controls the OSD processing unit to make the transparency of the OSD picture an opaque state.

4. The apparatus of claim 1, further comprising:
a user interface unit,
wherein the control unit controls the OSD processing unit to automatically increase the transparency of the OSD picture when the OSD picture is 2D and the image displayed through the image outputting unit is changed from the 3D image to the 2D image according to a user command received through the user interface unit or a preset event,
wherein the control unit controls the OSD processing unit to make the transparency of the OSD picture a translucent state.

5. The apparatus of claim 1, wherein when the OSD picture is 3D and the image displayed through the image outputting unit is changed from 3D to 2D, the control unit controls the OSD processing unit to change the OSD picture to 2D in a state that the transparency of the OSD picture is maintained,
wherein the transparency of the OSD picture is an opaque state.

6. The display apparatus according to claim 1, wherein a scroll bar to adjust the transparency of the OSD picture is displayed on the image outputting unit.

7. A display method comprising:
receiving a two-dimensional (2D) or a three-dimensional (3D) image;
displaying the received 2D or the received 3D image;
generating an on-screen display (OSD) picture overlapped with and shown on the displayed 2D or the displayed 3D image;
determining whether the displayed image is the 2D image or the 3D image; and
adjusting a transparency of the OSD picture according to the displayed image which is the 2D image or the 3D image;
wherein when the image is displayed in 2D or 3D and the OSD is displayed in 2D or 3D, such that the OSD is displayed in a different dimension than the image, adjusting the OSD to be in an opaque state.

8. The method of claim 7, further comprising:
changing the displayed image from 2D to 3D according to a preset option; and
adjusting the transparency of the OSD picture to reduce the transparency of the OSD picture when the OSD picture is 2D,
wherein the adjusting the transparency of the OSD picture to reduce the transparency of the OSD picture comprises adjusting the transparency of the OSD picture to an opaque state.

9. The method of claim 7, further comprising:
changing the displayed image from 2D to 3D according to a user command; and
adjusting the transparency of the OSD picture to reduce the transparency of the OSD picture when the OSD picture is 2D,
wherein the adjusting the transparency of the OSD picture to reduce the transparency of the OSD picture comprises adjusting the transparency of the OSD picture to an opaque state.

10. The method of claim 7, further comprising:
changing the displayed image from 3D to 2D according to a user command or a preset event; and
adjusting the transparency of the OSD picture to increase the transparency of the OSD picture when the OSD picture is 2D,
wherein the adjusting the transparency of the OSD picture to increase the transparency of the OSD picture comprises adjusting the transparency of the OSD picture to a translucent state.

11. The method of claim 7, further comprising:
changing the displayed image from 3D to 2D when the OSD picture is 3D; and
changing the OSD picture to 2D in a state that the transparency of the OSD picture is maintained,
wherein the transparency of the OSD picture is an opaque state.

* * * * *